United States Patent [19]
Fischer

[11] 4,101,754
[45] Jul. 18, 1978

[54] ADJUSTING CIRCUIT FOR USE IN PLASMA ARC CUTTING TORCH

[75] Inventor: Robert L. Fischer, Huntington, W. Va.

[73] Assignee: ACF Industries, Incorporated, New York, N.Y.

[21] Appl. No.: 730,605

[22] Filed: Oct. 7, 1976

[51] Int. Cl.$^2$ ................................ B23K 9/10
[52] U.S. Cl. ..................... 219/121 P; 219/124.03
[58] Field of Search ........ 219/121 P, 125 R, 125 PL, 219/124, 124.02, 124.03

[56] References Cited

U.S. PATENT DOCUMENTS

| | | | |
|---|---|---|---|
| 2,747,152 | 5/1956 | Greene | 219/125 PL |
| 3,398,342 | 8/1968 | Redman | 219/124 |
| 3,809,308 | 5/1974 | Roeder et al. | 219/124 |

FOREIGN PATENT DOCUMENTS

2,505,665   8/1976   Fed. Rep. of Germany ... 219/121 P

*Primary Examiner*—J. V. Truhe
*Assistant Examiner*—Clifford C. Shaw
*Attorney, Agent, or Firm*—Henry W. Cummings

[57] ABSTRACT

An electrical height control circuit for controlling the height of a plasma arc cutting torch includes a differential amplifier which compares a torch height detector voltage with an adjustable reference voltage for setting the torch height. In accordance with the invention an adjusting circuit is provided for changing the reference voltage to compensate for changes in the detector voltage caused by water or other material on the work piece to insure that the torch is maintained at the desired height above the work piece.

18 Claims, 8 Drawing Figures

ADJUSTING CIRCUIT FOR USE IN PLASMA ARC CUTTING TORCH

BACKGROUND OF THE INVENTION

This invention relates to the plasma arc cutting process for cutting metal sheets or plates into desired shapes. In this process plasma is formed by ionizing a gas in the extreme heat of an electric arc. Gas molecules absorb heat energy from the arc, dissociate into atoms, and then further break down into electrically-charged particles called ions. As described in U.S. Pat. No. 2,806,124, the "ionized" gas is forced through a very small nozzle and accelerated to form an intensely-hot, constricted arc that can melt metals. Water injection may be used to improve metal cut quality. As described in U.S. Pat. Nos. 3,567,898 and 3,641,308, water enters an annular chamber in the plasma arc nozzle below the plasma constriction point, and then passes out around the plasma jet. In so doing, it helps to further constrict the plasma jet, making it hotter and better defined. Upon striking the plate, the water removes excessive heat and inhibits slag adherence.

However the plasma arc cutting process generates considerable noise and vapor while in operation. The vapors are unpleasant and require a venting system, or used on a limited basis so that operating personnel are not adversely affected by the vapors.

One technique which has been used to materially reduce the noise and vapors emitting from the plasma arc is a water muffler. As described in U.S. Pat. No. 3,833,787, the water muffler includes a nozzle which fits on the plasma arc torch which directs a high flow of water in a shield around the plasma arc. The muffler water flow is initiated at the same time the plasma arc is started to muffle the noise generated in the jet mixing region at the exit of the nozzle and to prevent vapors from escaping from the torch and/or workpiece. The water muffler system is preferably used in connection with a water reservoir located below the workpiece to be cut, to prevent high intensity sound waves from escaping out of the bottom of the cut plate, U.S. Pat. No. 3,787,247.

The path that the torch follows is automatically controlled through known electrical scanning systems. This automatic control includes a control system for maintaining the torch at the proper height above the workpiece, as the torch cuts the workpiece into a desired shape.

In one control system the height of the plasma arc torch above the workpiece is controlled by a differential amplifier. A detector circuit indicates the distance between the plasma torch and the workpiece. This can be done for example, on the basis of the capacitance between a sensing electrode as one plate, the work piece as the other plate of the capacitor, and the air dielectric. The differential amplifier compares the output voltage of the detector circuit with a reference voltage circuit which includes a manually adjustable height control potentiometer. A difference between the detector voltage and the reference voltage causes the differential amplifier to generate an output of the correct polarity and magnitude to raise or lower the torch to a level at which the detector voltage is equal to the reference voltage.

When used with such a torch height control system, the water muffler produces so much water (as much as three-sixteenth inch) on the workpiece that the automatic height control of the plasma arc torch is disrupted, apparently because of the difference in dielectric properties of air and water. The water increases the capacitance and decreases the detector voltage. The resulting detector voltage applied to the differential amplifier is lower than normally would be the case with little or no water on the workpiece. This causes the differential amplifier to raise the plasma torch, as described in the preceeding paragraph, to a distance too high above the workpiece for efficient cutting of the workpiece by the plasma arc torch.

To correct this problem, the torch may be lowered by adjustment of a plasma torch height control potentiometer. However when the cutting operation is completed, the water muffler is automatically turned off. When the next workpiece to be cut is moved into the cutting fixture, there is little or no water from the water muffler system on the workpiece. If the potentiometer is adjusted to take into account the considerable water on the surface of the workpiece due to the water muffler and little or no water is present, the plasma torch will be driven into the workpiece, causing damage to the plasma torch.

The muffler water cannot be run continuously to maintain water on the workpiece without modification of the work area to provide an extensive drainage and/or recycle of a large volume of muffler water, which in many cases would be impractical.

Other material on the workpiece such as oil, grease and cleaning liquid may also cause changes in the detector voltage applied to the differential amplifier, and will thus raise or lower the torch to a level other than the desired cutting height.

SUMMARY OF THE INVENTION

In accordance with the invention, the reference voltage circuit is modified to include an adjusting circuit which changes the reference voltage applied to the differential amplifier to take into account the effect of capacitance changing material on the workpiece.

In one embodiment the reference voltage is lowered to compensate for material on the workpiece lowering the detector voltage by providing a resistor in the reference voltage circuit of a sufficient magnitude to compensate for the lower detector voltage. In another embodiment the reference voltage is lowered by a zener diode which is placed in parallel with the height adjustment potentiometer in the reference voltage circuit.

To retrofit existing circuits, the adjusting circuit includes means for by-passing all or a portion of the resistors in the reference voltage circuit at lower potential than the height control potentiometer, so that all or most of the voltage drop in the reference voltage circuit occurs prior to or within the height control potentiometer.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
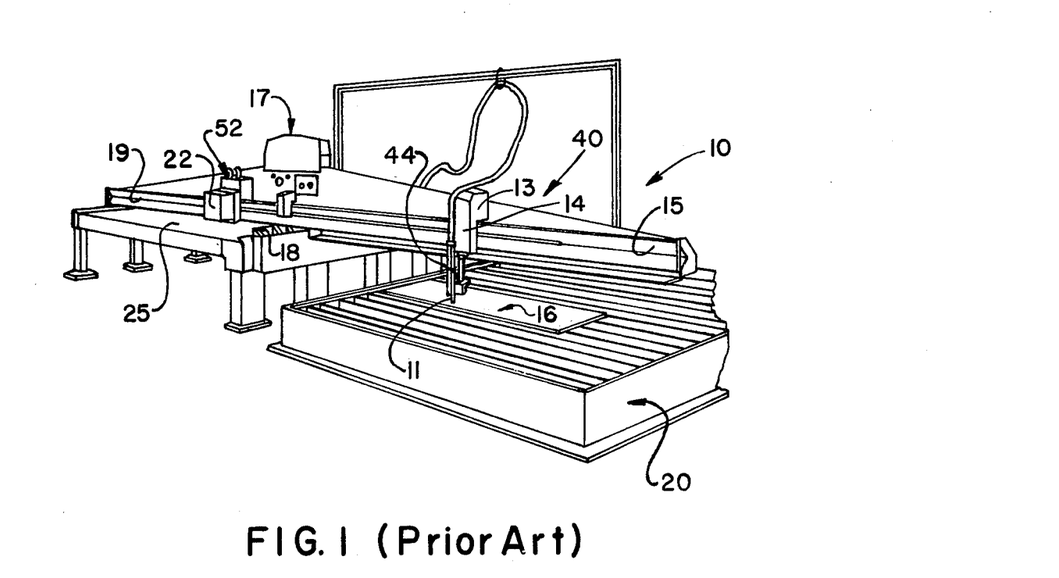
FIG. 1 is a perspective view of a representative plasma arc metal cutting machine.

Referring now to FIG. 1, a plasma torch cutting machine 10 is illustrated which employs a single plasma arc torch 11 mounted on a head 13. The head 13 includes a height control assembly 14 for raising and lowering the torch with respect to a workpiece to be cut, indicated at 16. The workpiece is supported on a cutting table 20 having a water reservoir constructed in accordance with the teachings of U.S. Pat. No. 3,787,247, hereby incorporated into the present application by this reference.

The head 13 is adapted to be traversed along a cantilevered beam arm 15 extending over the cutting table. The beam 15 itself is part of an assembly 17 which is adapted to be traversed along a rail 18 which extends transversely to the beam. Thus, the torch is capable of being translated in two directions within a horizontal plane.

As is conventional with cutting machines of this general type, the beam assembly 17 includes a second arm 19, extending on the opposite side of the rail 18 from the torch supporting arm, over a pattern table 25. This arm carries a scanning head 22 which is adapted to trace either a pattern or a line drawing mounted on the pattern table. The scanning head is coupled to the torch head 13 through an appropriate servo mechanism so that the movement of the torch parallels that of the tracing head. Thus, a cut following a contour corresponding to the pattern can be generated. Tracing and traversing equipment of this general type is well known and is not described in detail herein.

Torch 11 is constructed in accordance with the teachings of U.S. Pat. No. 3,641,308 which is hereby incorporated into the present application by this reference. As is described in greater detail in the specification of the U.S. Pat. No. 3,641,308, the torch 11 employs an electrode which is connected to an electric power source so as to generate an arc between the torch electrode and the workpiece being cut. Such a workpiece is indicated at 16 in FIG. 1. As is further described in the U.S. Pat. No. 3,641,308 a flow of an ionizable inert gas is directed around the electrode, so that a plasma is formed by the arc, which plasma is then projected as a jet to cut the workpiece.

Furthermore, in accordance with the teachings of the U.S. Pat. No. 3,641,308, the plasma jet is constricted by a flow of liquid which is directed radially inwardly against the plasma thereby to reduce its cross-section and concentrate the application of heat on the workpiece.

Figure 2:
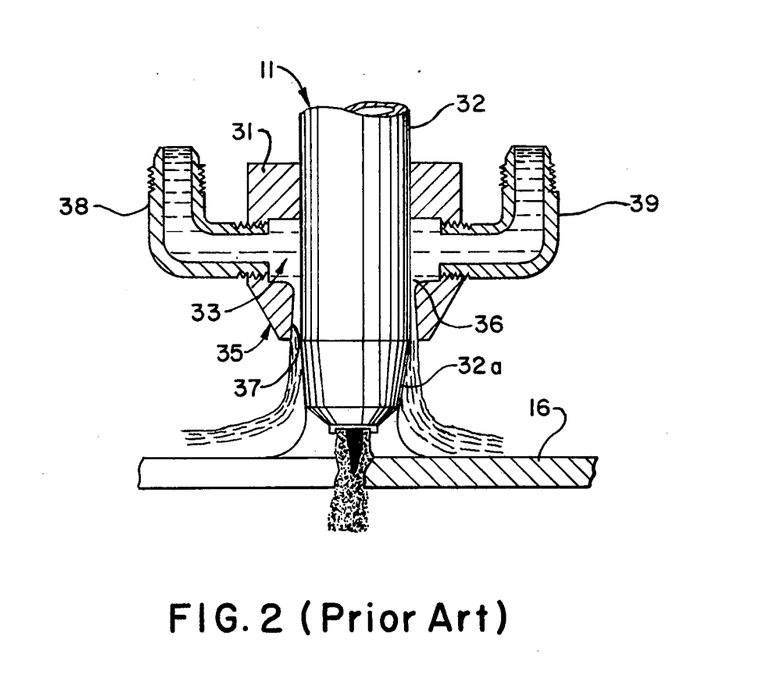
FIG. 2 is a sectional view illustrating the cutting torch and a water muffler.

In accordance with the teachings of U.S. Pat. No. 3,833,787, which is hereby incorporated into the present application by this reference, the torch 11 is provided with an annular collar member 31 which, together with the torch body, forms an annular plenum chamber 33 and a downwardly-directed, annular nozzle 35 having a constricted entrance 36 followed by a section 37 with a flaring or increasing cross-sectional area. A pair of inlets 38 and 39 are provided for coupling a flow of a liquid, such as water, to the plenum chamber 33. This water flow leaves the plenum chamber 33 through the nozzle portion 35, the constriction entrance 36 providing a pressure drop causing distribution of the flow around the plenum with the flaring cross-section of the nozzle operating to slow the liquid flow as much as poosible prior to its departure from the nozzle. The removable cap 32a which permits replacement of various torch components is constructed so as to be essentially flush with the torch body 32 at the mouth of the nozzle 35. Accordingly, the water leaving the nozzle will continue to follow the side of the torch and is led by the side of the torch to the gap between the torch and the workpiece. Thus, a slow moving, almost stagnant sheath of falling liquid is provided around the plasma jet between the torch and the work piece.

This liquid flow is a relatively low velocity or stagnant flow as compared with the inwardly directed constricting jet which is impinged upon the plasma as described in the U.S. Pat. No. 3,641,308 and thus should be clearly distinguished therefrom. As is discussed in greater detail in the U.S. Pat. No. 3,833,787, this sheath operates to absorb and dampen acoustic energy generated by the plasma jet in the region between the torch and the workpiece, and prevent vapors from escaping from the torch into the work area. However the water sheath does generate considerable water on the workpiece, up to three-sixteenth inch or occasionally more.

Figure 3:
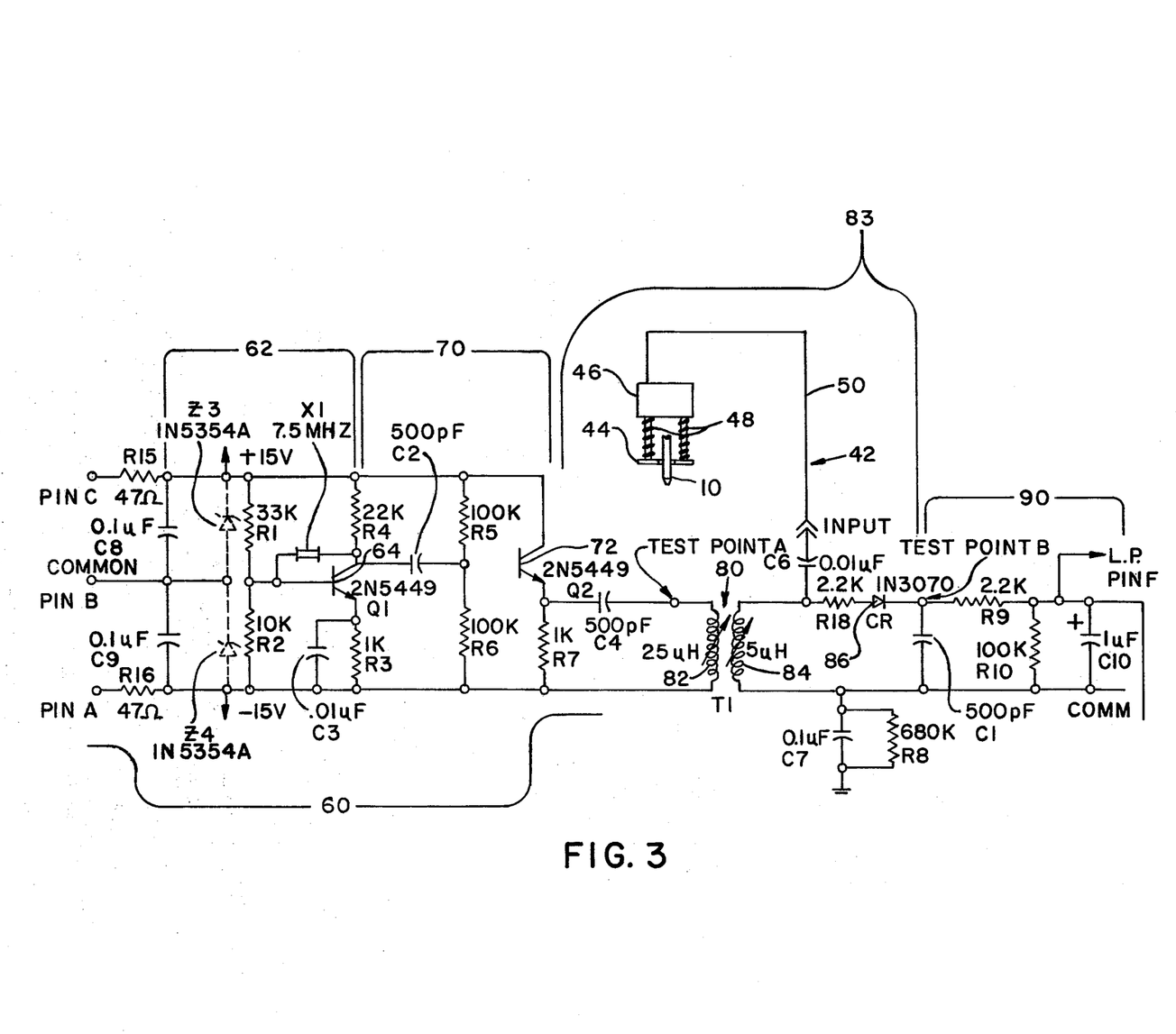
FIG. 3 is a schematic view of the torch height control circuit with the plasma arc torch removed for clarity.
Figure 3A:
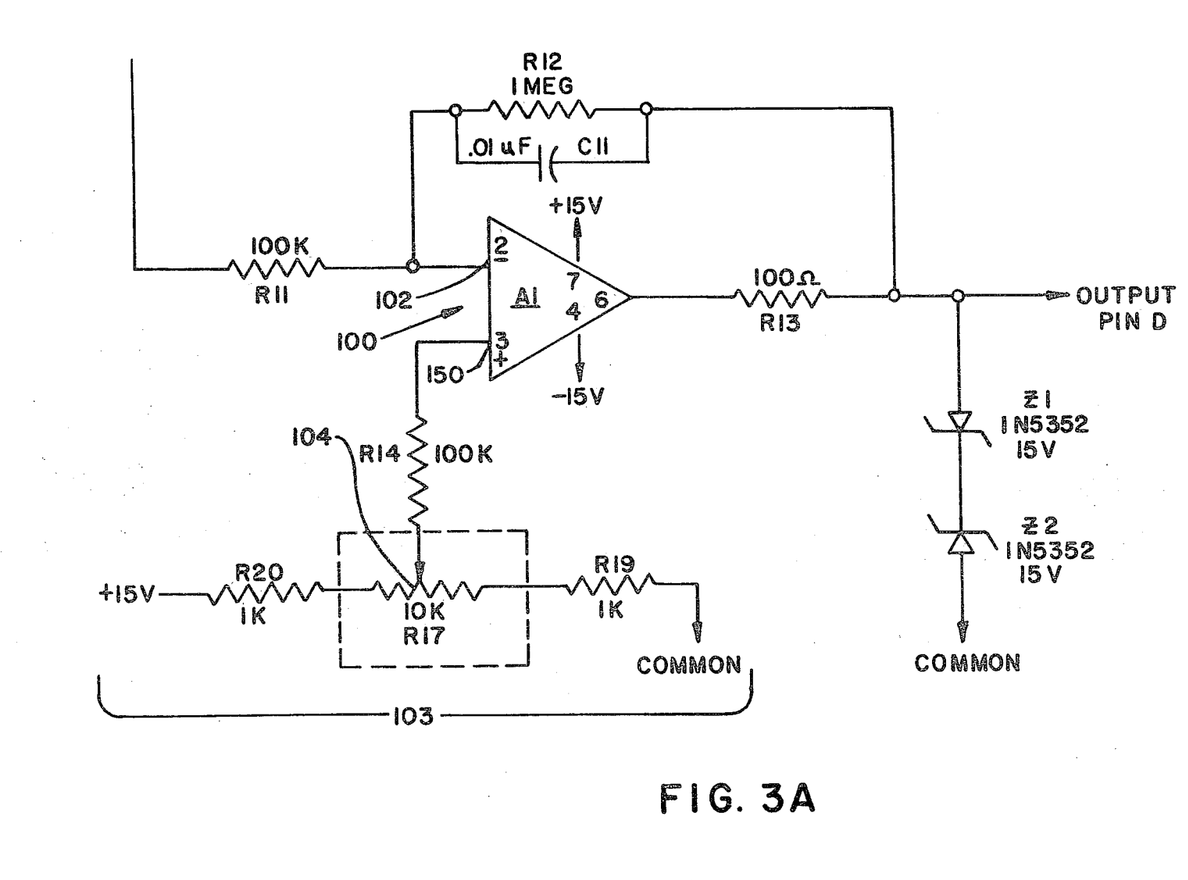
FIG. 3A is a schematic view of the differential amplifier portion of the circuit shown in FIG. 3.

A torch height regulating system 40 used for plasma arc torch cutting is commercially available; for example, that system used on Union Carbide Plasma Cutting Machine Model No. CM100, Linde Division 270 Park Ave., New York, N.Y. As shown in FIG. 3, this system is composed of three main components or electrical units, a sensor or detector circuit 42, a high frequency generating circuit 60, and a torch height control differential amplifier 100 (FIG. 3A). Briefly, the sensor component includes a detector circuit 83 which measures the capacitance between the sensor and the workpiece to be cut. This capacitance is converted to a detector voltage. This detector voltage is compared to a reference height setting voltage 150 in differential amplifier 100 (FIG. 3A). The difference between two voltages is an error signal which causes a motor to move the torch up or down until the difference between the reference circuit voltage and the detector circuit voltage is zero.

Referring to FIG. 3 the sensor component or circuit 42 includes a sense foot 44 mounted on a block 46 by means of a pair of conductive springs 48. Springs 48 are connected in block 46 to a coaxial cable 50 which connects the sense foot to the electrical control box 52 FIG. 1. Block 46 is made of electrical insulating material. The sense foot is horseshoe in shape to surround the torch 11 on three sides. The sense foot is made of corrosion resistant, conductive material such as stainless steel. Because of heat and slag accumulation on the sense foot, the sense foot should be periodically removed and cleaned. The coaxial cables 50 are preferably made of a low capacitance cable, RG 79B or equivalent. The cables are also subject to deterioration because of heat and slag splash. Thus they also requires periodic repair or replacement.

The electronics component 60 includes an oscillator circuit 62 including a 7.5Mhz crystal oscillator 64. The oscillator circuit is of conventional construction with representative valves for the circuit components indicated in FIG. 3. The oscillator circuit is buffered by a buffing circuit 70 which prevents the transformer 80 from effecting the oscillator voltage. Buffing circuit 70 includes a transistor 72 which feeds the primary 82 of transformer 80. The secondary 84 of transformer 80 in conjunction with the capacitance of the coaxial cables 50, springs 48, capacitor C6, the sense foot 44 and workpiece 16 form a tuned detector circuit 83. The detector circuit 83 is adjusted so that when the torch 11 is raised clear of the workpiece 16 the high frequency voltage at the transformer secondary 84 is maximum.

Diode 86 converts the detector circuit voltage to d.c. The d.c. output of the detector circuit is passed through a filter circuit 90 of conventional construction and then into the inverting input 102 (FIG. 3A) of the differential amplifier 100 which may be a commercially available integrated circuit. A reference voltage circuit 103 including a height adjusting potentiometer 104 of 10,000 ohms is fed to the non-inverting input 150 of the differential amplifier 100. Potentiometer 104 is also commercially available.

As the torch 11 is brought closer to the workpiece 16, the capacitance increases, causing the voltage to decrease. As the torch moves away from the workpiece 16 the capacitance decreases, causing the voltage to increase.

If the torch 11 moves closer to the workpiece, the detector voltage decreases and the differential amplifier output becomes positive. Conversely if the torch 11 gets too far from the workpiece, the differential amplifier output becomes negative. When the two voltages are identical, the output of the differential amplifier is zero.

The output of the differential amplifier goes to a motor up control circuit, and a motor down control circuit. For motor up, as the sensor 42 gets closer to the workpiece 16, the output of the detector circuit 83 starts going positive. When the differential amplifier out voltage reaches +5 volts, the "up" motor turns on. The "up" motor stays on until the error between the detector voltage and the reference voltage is reduced to zero. A reverse sequence of events occurs when the sensor is too far from the plate. When the output of the differential amplifier voltage reaches −5 volts, the "down" motor turns on and stays on until the error between the detector voltage and the reference voltage is reduced to zero.

The height control system 40 works effectively to control the height of torch 11. This is true even when the plasma jet is constricted by a flow of water according to U.S. Pat. No. 3,641,308 which results in a thin film of water on the workpiece. However the water from the water muffler 30 described in U.S. Pat. No. 3,833,787 produces so much water that the automatic height control of the torch 11 is disrupted. The water on the workpiece 16 apparently increases the capacitive between the sensor and the workpiece and then causes the detector voltage to decrease. This in turn causes the differential amplifier to raise the plasma torch according to the sequence described in the last preceding two paragraphs.

The torch 11 may be lowered by adjustment of a plasma torch height control potentiometer 104. However when the next workpiece is placed in the cutting fixture, the lower reference voltage will drive the plasma torch into the workpiece. This may damage the plasma torch and/or ruin the cut on that particular workpiece.

Figure 4:
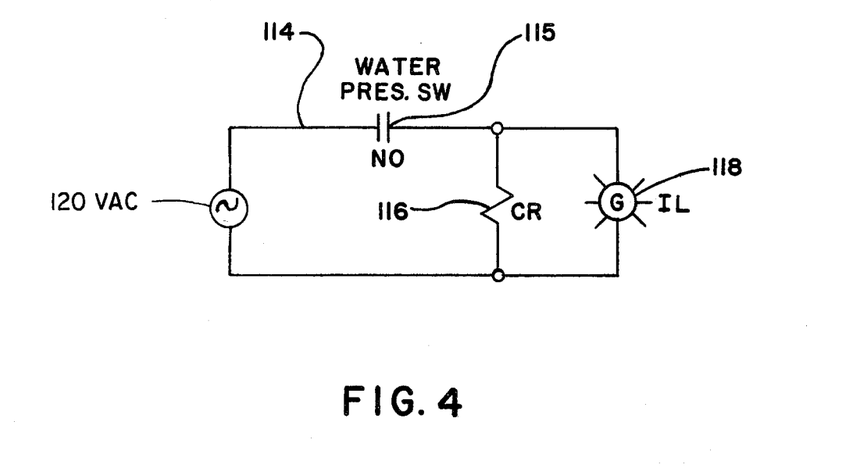
FIG. 4 is a schematic view of a pressure switch and a control relay circuit which may be utilized to activate the adjusting circuit of FIG. 5.

In accordance with the present invention the reference voltage circuit 103 in the automatic torch height control system is provided with an adjusting circuit which takes into account material on the workpiece which effects the detector circuit voltage, such as water resulting from the water muffler. While the adjusting circuit may be made operative to control a variety of materials on the workpiece such as oil, cleaning liquids, etc., the adjusting circuit is particularly adapt to taking into account the water on the workpiece resulting from the water muffler. Preferably when the water muffler is turned on, the adjusting circuit is automatically activated, for example, by an activation circuit 114 (FIG. 4) including a pressure switch 115 in the water muffler supply line (not shown) which in turn activates a control relay 116. Water pressure in the feed line automatically closes switch 115 putting circuit 114 into operation. Control relay 116 then activates the reference voltage adjusting circuit. If desired, an indicator light 118 may be provided in parallel with control relay 116 to indicate when the adjusting circuit is in operation.

The adjusting circuit includes means for varying the voltage of the reference voltage fed to the differential amplifier to compensate for change in the detector circuit voltage applied to the differential amplifier caused by material on the workpiece. For example, significant amounts of water on the workpiece resulting from the water muffler, increase the capacitance between the sensor and the workpiece and this in turn decreases the voltage in the detector circuit applied to the differential amplifier.

Figure 5:
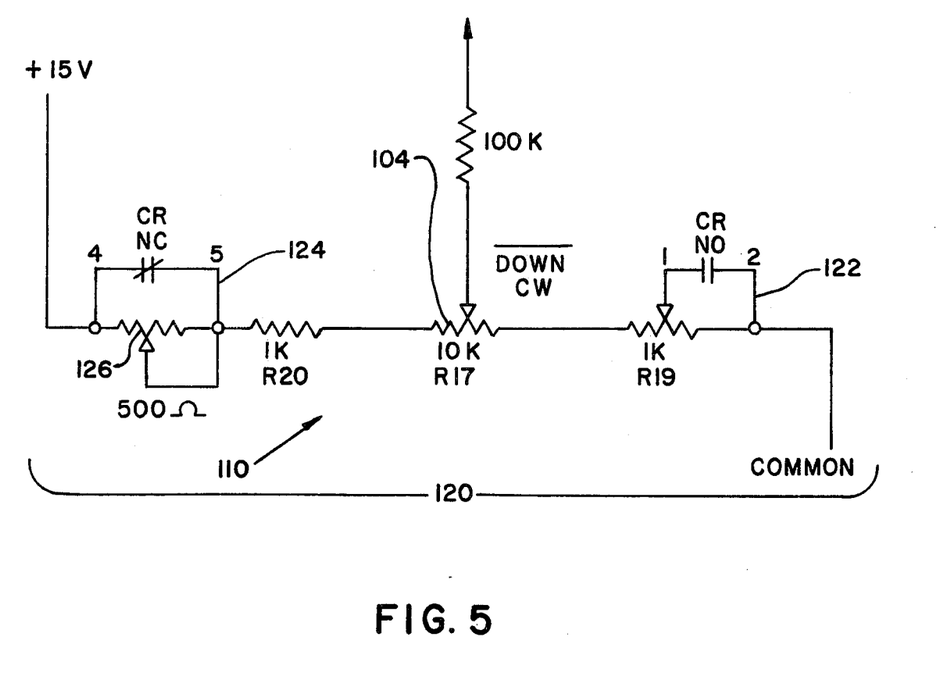
FIG. 5 is a schematic view of one embodiment of the adjusting circuit of the present invention.

In one embodiment of the invention the reference voltage circuit 103 in FIG. 3A of an existing height control circuit is modified as indicated at 120 in FIG. 5 to lower the reference voltage applied to the differential amplifier. This is accomplished by shorting all or a portion of resistor R19 of 1000 ohms by means of a relay circuit 122 so that the majority of the 15 volt voltage drop in circuit 120 occurs before control potentiometer 104.

In addition to by-passing all or part of resistor R19, relay 115 activates a variable resistor circuit 124 provided in circuit 120 before the reference voltage control potentiometer 104. Circuit 124 includes a variable resistor or potentiometer 126 having a maximum value of 500 ohms. The operator must then adjust both variable resistors 126 and 104 to obtain a satisfactory height for the plasma torch while the water muffler is in operation. However, once adjusted the adjusting circuit 120 does automatically maintain the height of the plasma torch at the desired level above the workpiece while the water muffler is in operation. When the sensing foot 44 is cleaned, replaced, or mounted in a different position relative to block 46 then both variable resistors 104 and 120 must be readjusted for proper torch height. While this adjusting circuit works fairly well, at times this dual adjustment has been time consuming, resulting in reduced output of the cutting torch assembly.

Figures 6, 7:
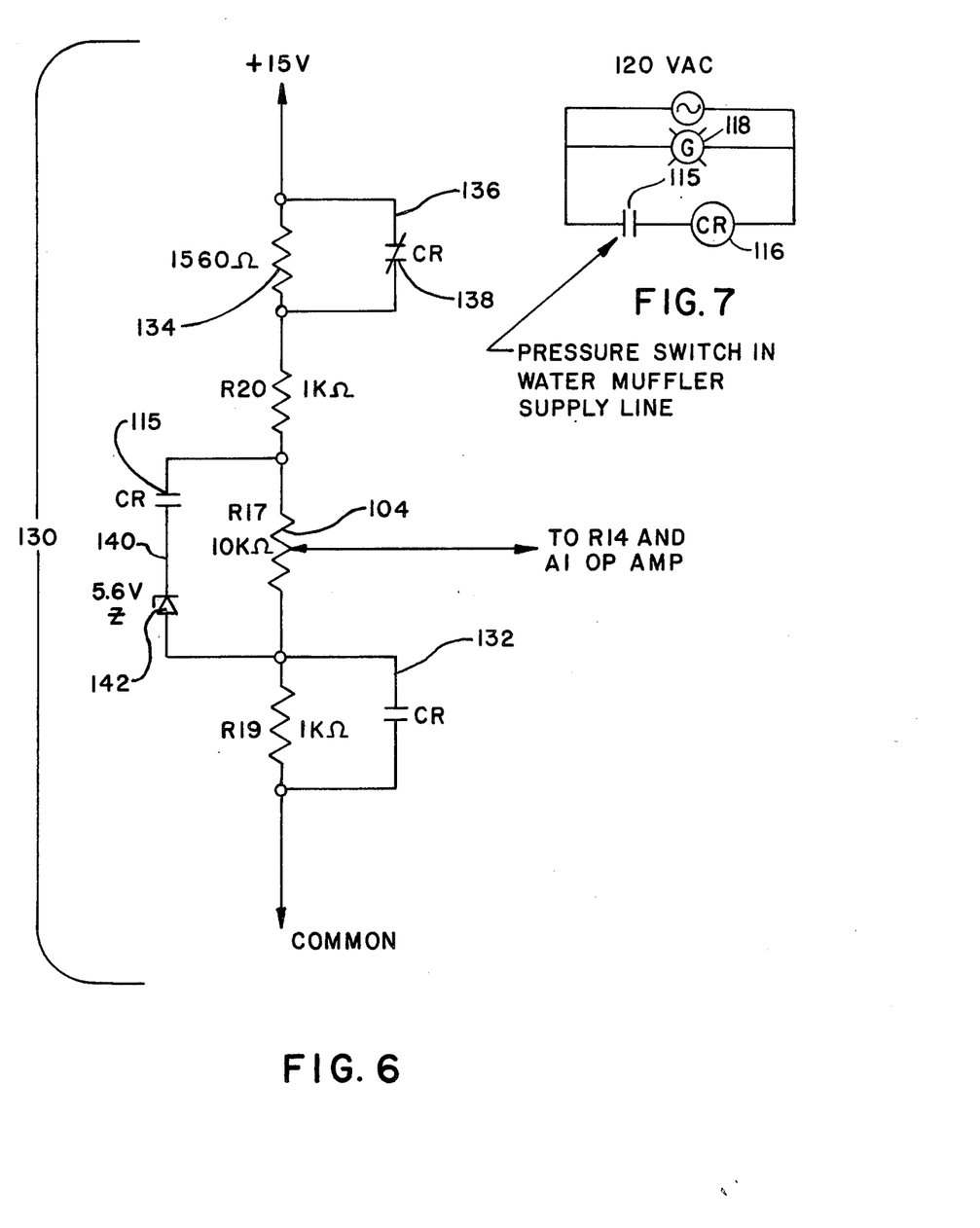
FIG. 6 is a schematic view of another embodiment of an adjusting circuit of the present invention.
FIG. 7 is a schematic view of a pressure switch and control relay circuit which may be utilized to activate the adjusting circuit shown in FIG. 6.

The preferred adjusting circuit of the present invention is illustrated at 130 in FIG. 6. This adjusting circuit is also preferably activated automatically when the water muffler is turned on, for example by a pressure activated switch 115 in the water muffler supply line illustrated in FIG. 7 as discussed above, which activates a control relay 116. In this embodiment, when applied to an existing reference voltage circuit, when adjusting circuit 130 is activated, R19 is completely by-passed by bypass circuit 132, activated by control relay 116. Thus the entire voltage drop in the reference voltage circuit occurs prior to and within height control potentiometer 104. In addition a fixed resistor 134 is provided in series with 1000 ohm resistor R20. When the water muffler is not turned on this resistor is by-passed through circuit 136 through normally closed contacts 138. However control relay 116 opens switch 138 when the water muffler is turned on. It has been found that this added resistance should be in the range of 1000 to 2000 ohms, preferably 1550 to 1570 ohms.

A zener diode circuit 140 including a zener diode 142 is provided in parallel with height adjusting potentiometer 104. The voltage drop across the zener diode 142 is constant and is chosen to be such that the torch 11 will return to the height set on the height control potentiometer 104, and the same time not be so large as to remove the sensitivity of the differential amplifier to change in capacitance between sense foot 44 and the workpiece 16. For a 15 volt reference voltage circuit drop, and a 1560 ohm resistance at 134, this zener voltage has been found to be within the range of about 5 to 6 volts, preferably around 5½ volts. A 5.6 volt zener diode 142 provided in parallel with height control potentiometer 104 of 10,000 ohm resistance will maintain the torch height within about one-eight inch of the potentiometer height control setting.

When the sensor 44 is cleaned or replaced, or mounted a different distance relative to block 46, only height control potentiometer 104 need be adjusted. This is accomplished quickly and little cutting time is lost in such an adjustment.

What is claimed is:

1. In a plasma arc torch cutting assembly including a control circuit for automatically controlling the height of a plasma arc torch above a metal work piece to be cut; said cutting assembly including a water muffler assembly for reducing noise and fumes generated by the cutting torch; said control circuit including a reference voltage circuit having means for manually setting the desired height of the plasma torch above the work piece, and a detector circuit which senses the height of the plasma torch above the work piece based on the difference in control capacitance between the work piece and a sensor located adjacent said plasma torch; said reference voltage circuit and said detector circuit being fed into a differential amplifier; said differential amplifier connected to means for varying the height of said plasma arc torch; the improvement wherein the reference voltage circuit includes an adjusting circuit which takes into account the effect of water on the work piece which caused a significant change in said control capacitance; said adjusting circuit including means for varying the reference voltage applied to said differential amplifier to compensate for the change in the detector circuit voltage caused by the change in said control capacitance caused by water on the work piece.

2. A plasma arc torch cutting assembly according to claim 1 wherein said means for manually setting the height of the plasma torch includes a potentiometer.

3. A plasma arc torch cutting assembly according to claim 2 wherein means are provided for automatically activating said adjusting circuit when the water muffler is turned on.

4. A plasma arc torch cutting assembly according to claim 3 wherein the means for varying the reference voltage includes a zener diode which is placed in parallel with said manual height adjustment potentiometer in the reference voltage circuit.

5. A plasma arc torch cutting assembly according to claim 4 wherein said reference voltage circuit includes a variable resistor at a more positive potential than said height control.

6. A plasma arc torch cutting assembly according to claim 4 wherein said adjusting circuit includes means for bypassing at least a portion of the resistance provided in said reference voltage circuit at a more negative potential than said height control potentiometer.

7. A plasma arc torch cutting assembly according to claim 6 wherein the total voltage drop across said reference voltage circuit is about 15 volts.

8. A plasma arc torch cutting assembly according to claim 7 wherein the voltage of said zener diode is between 5 and 6 volts.

9. A plasma arc torch cutting assembly according to claim 8 wherein the voltage of said zener diode is about 5½ volts.

10. A plasma arc torch cutting assembly according to claim 3 wherein the means for automatically activating said adjusting circuit includes a control relay which is activated when said water muffler is turned on, and is deactivated when the water muffler is turned off.

11. A plasma arc torch cutting assembly according to claim 10 wherein said control relay is activated by a pressure switch in a supply line to the water muffler.

12. A plasma arc torch cutting assembly according to claim 11 wherein said resistor in said reference voltage circuit is a variable resistor.

13. A plasma arc torch cutting assembly according to claim 3 wherein the means for varying the reference voltage includes at least one resistor in the reference voltage circuit at a potential above said potentiometer of a magnitude to compensate for the change in voltage in the detector circuit resulting from the water muffler water.

14. A method for automatically controlling the height of a plasma arc torch above a work piece made of a first metallic material to be cut comprising:
  providing a height control circuit including a detector circuit and a reference voltage circuit;
  setting the desired height of a plasma torch above the work piece with said reference voltage circuit;
  sensing the height of the plasma torch above the work piece with said detector circuit based on the difference in control capacitance between the work piece and a sensor in said detector circuit located adjacent said plasma torch;
  feeding said reference voltage circuit and said detector circuit into a differential amplifier;
  varying the height of said plasma arc torch based on the output of said differential amplifier, to obtain said desired height; detecting the presence of material other than said first metallic material on the work piece which causes a significant change in said control capacitance;
  varying the reference voltage applied to said differential amplifier with an adjusting circuit to compensate for the change in the detector circuit voltage applied to said differential amplifier caused by the change in said control capacitance due to said other material on the work piece.

15. A method according to claim 14 including setting the initial height of the torch with a potentiometer located in said reference voltage circuit.

16. A method according to claim 15 including varying the reference voltage by means of at least one resistor located in the reference voltage circuit at a potential above said potentiometer.

17. A method according to claim 14 including varying the reference voltage by means of a zener diode located in said reference voltage circuit in parallel with said potentiometer.

18. A method according to claim 14 including automatically activating the adjusting circuit when the plasma torch is turned on.

* * * * *